March 19, 1957     A. H. BRUSH     2,785,726
EXPANDED INSERT FOR ENGAGEMENT WITH FREE-RUNNING SCREW
Filed Dec. 14, 1954
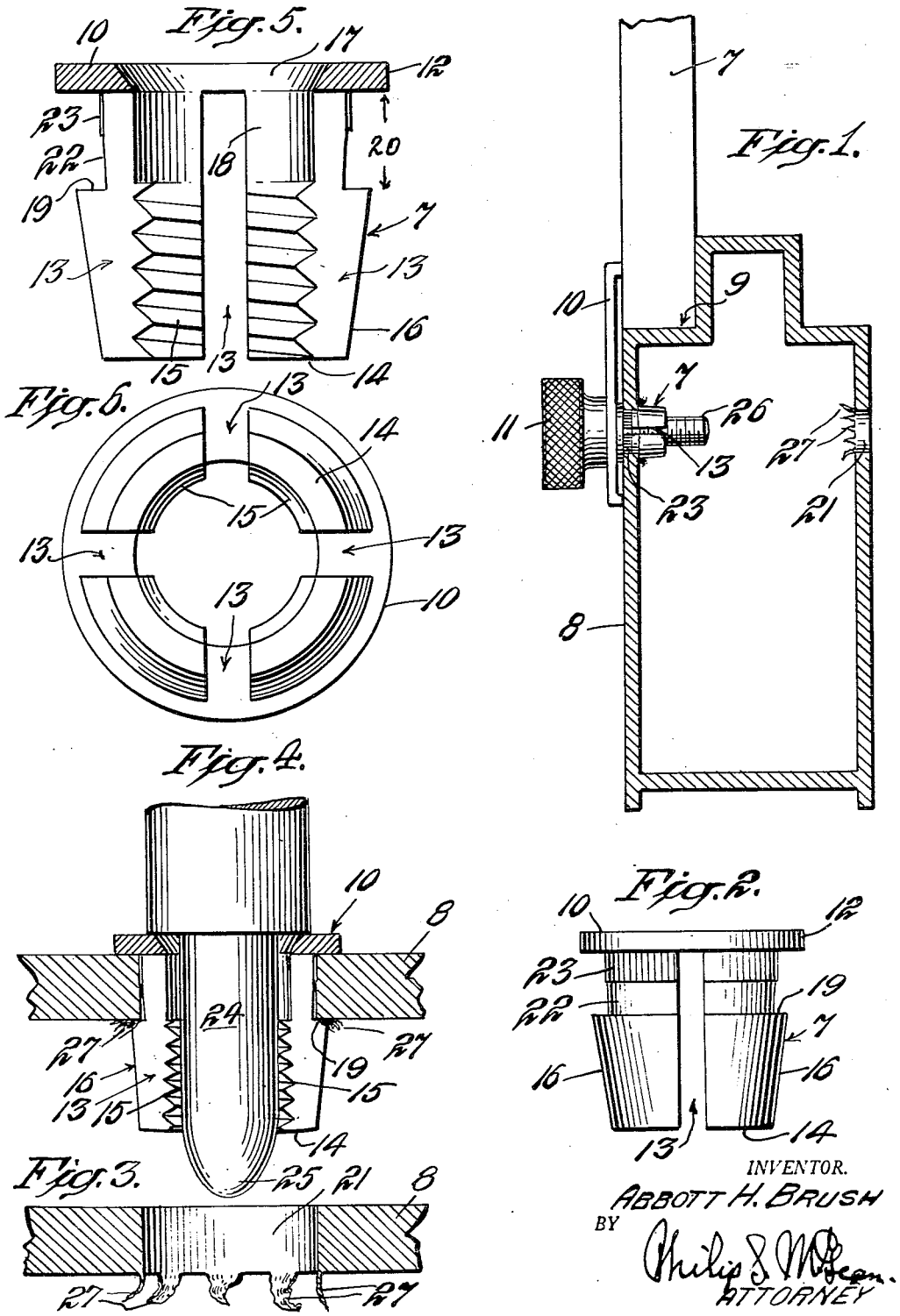
INVENTOR.
ABBOTT H. BRUSH
BY
ATTORNEY United States Patent Office 2,785,726
Patented Mar. 19, 1957

2,785,726

EXPANDED INSERT FOR ENGAGEMENT WITH FREE-RUNNING SCREW

Abbott H. Brush, Greenwich, Conn., assignor to Norman Jay Boots, Stamford, Conn.

Application December 14, 1954, Serial No. 475,074

1 Claim. (Cl. 151—41.72)

The invention herein disclosed is a tapped hole insert for a free-turning screw.

The usual tapped hole inserts such as represented by Brush Patents 2,393,606 of January 29, 1946, and 2,448,351 of August 31, 1948, are expanded by insertion of the screw. This locks the insert in place and at the same time locks the screw in the insert. This torque-locking of the screw in the insert is desirable where the screw is to be inserted and left in that secured relation.

Where, however, it is intended that the screw be removed or loosened, and particularly where it is planned that the screw be removable by hand, this torque-locking is undesirable and, in fact, objectionable.

There are places where because of thinness or fragility of the material or for other reasons, tapped hole inserts must be used and where also a free-turning screw action is desirable or necessary.

An example where such requirements are present is the case of extruded aluminum storm sash where the removable panel sections are held in place by knurled thumb-screws supposed to be free for finger turning.

The present invention provides an insert which can be properly held in thin material such as in hollow extruded storm door and window frames and which will provide a torque-free mounting for the screw.

This is accomplished by constructing the tapped screw insert so that it may be expanded and locked in place without injury to the screw threads, by a special, oversize punch, leaving the screw threads, after expansion and securing in the thin material, in condition to freely receive the companion screw without binding or resistance.

Special features of the invention relate to construction of the insert to guide and admit the expanding punch in a manner avoiding injury to the screw threads, and to the provision of special means for locking the insert against movement in any direction in the opening provided for it.

Other novel features, details of construction and objects attained as a result of such features are more fully disclosed in the specification following.

The drawing accompanying and forming part of the specification illustrates a practical embodiment of the invention and one application of the same to a present structural need.

This drawing, however, is illustrative in character and it will be appreciated that details may be modified and changed as regards the immediate showing, all within the true intent and scope of the invention as hereinafter defined and claimed.

Fig. 1 in the drawing is a broken and part sectional view showing one of the units installed in a thin walled extruded door frame and used to provide a tapped hole for one of the screws holding a screen or storm sash in place in the frame;

Fig. 2 is an enlarged side elevational view of the insert in its normal position as manufactured and as it appears when restored to normal size in the opening provided for it;

Fig. 3 is a broken sectional view showing how the thin material in which the insert is used will ordinarily be left with burrs about the drilled or punched hole, these last to be utilized by the insert as a part of the means for securing it in place;

Fig. 4 is a broken part sectional view showing the insert locked in place in the material by the expander tool;

Figs. 5 and 6 are further enlarged longitudinal sectional and end views, respectively, of the insert.

In the example chosen for illustration the invention is shown applied to the holding of a removable sash panel 7 in a hollow extruded metal door or window frame 8.

These frames are of light, thin walled construction, too thin to carry adequate screw threads, and requiring the use of tapped fasteners or equivalent if screws are to be used therein.

Fig 1 shows the normal relation in such constructions with the sash panel 7 seated in a shouldered portion 9 of the frame and held there by over-reaching toggle-like clips 10 secured by knurled head thumb-screws 11.

The insert is shown as in the form of a tubular stud having an outstanding flat flange 12 forming an abutment head at one end and slotted inwardly at 13 from the opposite end to this head to form arcuate segments 14 internally screw-threaded at 15 and externally tapered and beveled at 16.

The outer or flanged end of the unit has a beveled entrance-way 17 opening into a cylindrical enlargement 18 terminating in the outer end of the screw thread.

The external bevel of the segments terminates at the larger end in a more or less sharply angled abutment shoulder 19 at a distance 20 from the head usually approximating or somewhat greater than the thickness of the material wall in which the insert is to be used. This shoulder is of greater diameter than the hole 21 in the material.

The neck of the insert, as shown at 22, between the head 12 and locking shoulder 19 is of slightly less diameter than the hole and that part of the neck closest the head is straight knurled, as shown at 23, to the approximate or slightly larger diameter than the hole.

The stud may have only a single slot or be cross-slotted, as shown, or have more slots, depending on flexibility or bendability of segments desired.

In the construction shown the cross-slots 13 extend all the way to the flange head and the neck portion is reduced in thickness, providing flexibility such that the inserts may ordinarily be pushed into position, particularly in soft aluminum extrusions, by hand.

In this operation the beveled and more or less yieldingly supported segments will collapse to the extent required for the locking shoulder to pass through the opening and to some extent spring open behind the inner face of the material.

The neck portion 22 being of less diameter than the hole, does not interfere with or retard this reaction but in the final part of this seating movement the longitudinally extending straight knurls 23 at the outer end of the neck grip or bite into the wall of the opening to lock the insert against rotational movement, the condition indicated in Fig. 4.

After being fully seated in the opening provided for it, the insert is expanded or restored substantially to its original dimensions by an expanding tool in the nature of an oversize punch 24, Fig. 4, having a rounded or pointed inner end 25 and of a size to freely enter the tapered and enlarged outer end portion 17, 18 of the stud and to engage the ridges of the screw threads sufficiently to slightly over-expand and give the segments a permanent set such as to receive the stem 26 of the thumb-screw in free-running engagement.

In drilling or punching holes in thin material such as described, it is quite usual and in many cases unavoidable to leave rough edges and burrs such as indicated at 27, about the edges of the openings. The present invention takes advantage of that fact, utilizing such rough extensions to obtain a more secure anchorage of the insert in the material.

Figs. 1, 3 and 4 show how this roughness and extension of burrs will usually project beyond the inner face of the material and how the arcuate screw segments, in being expanded or restored to their original conformation or position, will force back and cut through such burrs to secure firmer anchorage in the material.

In this action the locking shoulders 19 and the sharp edges afforded by the slots 13, to some extent cut into and through the irregularly placed burrs about the openings to anchor the inserts to best advantage in the openings.

The invention provides a particularly quick and simple assemblage since the inserts are yieldable enough to be forced into position by hand and then can be secured by a simple, straight punch operation of the spreading tool 24 which with its pointed end 25 and the bevel 17 of the insert is readily guided into place, and which with the enlarged and clear outer end portion 18 of the insert, enters without obstruction, and then by slight engagement with the ridges of the screw threads forces the split inner end open to fully expanded condition without marring or otherwise injuring the threads. Actually the oversize punch forces the split portions of the insert open to a slightly greater extent than the normal or manufactured size of the unit, so that on withdrawal of the punch the insert will take a final "set" approximately to the original dimensions, thus making certain that the screw will have a free-running fit in the anchored insert.

The smooth, unthreaded socket 18 in the outer end of the insert being in the solid, non-expandable head portion of the unit, is of necessity larger than the punch and larger than the peak diameter of the screw threads so as to freely admit the expanding punch. In addition to its guiding and centering function, this socket may be of a size just slightly greater than the oversize punch to prevent use of a too large expander which might over-expand and injure or impair the utility of the insert.

The faculty of the insert in expanding, brushing aside and cutting into the burrs about the opening in which it is seated enables the insert to be used in varying thicknesses of material.

The engagement of the insert in the opening with a straight push and the expansion then by a straight push action, without any twisting movement in either case, assures firm, positive interlock with no weakness or tendency to turn when a screw of proper size is engaged in the insert.

While particularly advantageous for storm sash and constituting in that case a particularly desirable combination, it will be evident from the foregoing that the invention is applicable to many different purposes and useful combinations.

An important advantage of the invention is that when used in relatively soft materials such as extruded aluminum, one single grip length will serve for a wide range of material thicknesses. This is so because if the distance 20 between the head and the abrupt and more or less sharp shoulder 19 is less than the thickness of the material, the punch 24 will serve to drive the shoulder into the surrounding, relatively soft material. If on the other hand, the distance 20 is greater than the thickness of the material this will be compensated for, if burrs are present, by the shoulder cutting through and over the burrs to accomplish a firm seating of the insert.

While the invention takes advantage of the presence of burrs in securing a firm anchorage, it will be realized that this fixing of the insert in the material does not depend upon the presence of burrs and that the insert will secure a firm seating in the material even if no burrs are present.

The enlarged socket 18 in the outer end of the insert, in addition to affording a guide and centering means for the entering punch, is of special value for assembly purposes, particularly where a large number of inserts are used, these sockets then serving as temporary holders into which the screws may be dropped, preparatory to their being turned into the screw threads.

What is claimed is:

Insert to form a tapped hole in thin, relatively soft material such as extruded aluminum and which will be secured in place against rotation or removal independently of the screw to be used with it and leaving the screw free to be turned into and out of the insert without the screw exerting expansion on the insert or the insert locking the screw against rotation and comprising a tubular stud of harder material than the soft material in which the insert is to be used, said stud having a complete non-expansible abutment flange at the outer end and slotted through from the inner end approximately to said flange and thereby providing separated segments, said stud having a reduced cylindrical neck portion adjoining said non-expansible flange, terminating in an abrupt holding shoulder having a sharp cutting edge at a distance from the flange approximating the thickness of the material in which the insert is to be used, said reduced neck portion being of slightly less diameter than the hole in which the insert is to be used and a part of said reduced neck portion being knurled to slightly greater diameter than the hole in which the insert is to be used, the outer end of the stud having an internal smooth cylindrical socket extending inwardly from said non-expansible flange into the slotted and knurled reduced neck portion and the separated segments of the stud being internally screw threaded to lesser diameter than said socket with the screw threads extending from the inner end of the socket to the inner end of the stud and whereby after insertion of the insert in a hole intended for the same in extruded aluminum or like material a smooth expanding tool of slightly greater diameter than the screw threads may be entered through the outer, smooth cylindrical socket into sliding engagement over the inner screw threaded portions of the segments to expand the latter to slightly greater than original form and thereby cause the sharp edged abrupt shouldered and sharp slotted edges of the segments to bite into burrs left about the opening to lock the insert against rotation or removal and with the smooth cylindrical socket at the outer end of the insert in position to receive and guide a holding screw into free running engagement with the inner threaded portions of the insert.

References Cited in the file of this patent

UNITED STATES PATENTS

| | | |
|---|---|---|
| 1,738,609 | Pivonski et al. | Dec. 10, 1929 |
| 2,026,757 | Swanstrom | Jan. 7, 1936 |
| 2,333,277 | Swank | Nov. 2, 1943 |
| 2,393,606 | Brush | Jan. 29, 1946 |
| 2,616,328 | Kingsmore | Nov. 4, 1952 |

FOREIGN PATENTS

| | | |
|---|---|---|
| 707,819 | Great Britain | Apr. 21, 1954 |